(12) United States Patent
Matsui

(10) Patent No.: US 8,788,537 B2
(45) Date of Patent: Jul. 22, 2014

(54) COMPUTER READABLE MEDIUM STORING INFORMATION PROCESSING PROGRAM, INFORMATION PROCESSING APPARATUS, AND INFORMATION PROCESSING METHOD

(75) Inventor: Haruki Matsui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 790 days.

(21) Appl. No.: 13/024,110

(22) Filed: Feb. 9, 2011

(65) Prior Publication Data
US 2011/0302384 A1    Dec. 8, 2011

(30) Foreign Application Priority Data
Jun. 3, 2010    (JP) ................. 2010-127693

(51) Int. Cl.
*G06F 12/00*    (2006.01)

(52) U.S. Cl.
USPC ............ 707/797; 711/E12.023; 711/E12.022; 711/E12.008

(58) Field of Classification Search
USPC ........................................................ 711/166
See application file for complete search history.

(56) References Cited

U.S. PATENT DOCUMENTS
7,873,808 B2 *   1/2011   Stewart ...................... 711/201

FOREIGN PATENT DOCUMENTS
JP    11-327998 A    11/1999
JP    2002-236645 A    8/2002
JP    2003-178055 A    6/2003

* cited by examiner

*Primary Examiner* — Reginald Bragdon
*Assistant Examiner* — Hamdy S Ahmed
(74) *Attorney, Agent, or Firm* — Sughrue Mion, PLLC

(57) ABSTRACT

A computer readable medium stores a program causing a computer to execute a process including receiving an instruction for deleting an information group from a first memory; extracting, from the first memory, information regarding information groups having a parent-child relationship with a target information group to be deleted in accordance with the received instruction; extracting a user identification code associated with the target information group from a second memory; storing an identification code of the target information group, the information regarding the information groups, and the extracted user identification code in association with one another in a third memory; deleting the target information group from the first memory; and changing the structure information stored in the first memory to structure information obtained after the target information group has been deleted from the first memory, by changing the child information group as a child of the parent information group.

11 Claims, 11 Drawing Sheets

FIG. 3

| TASK ID | HIGH-LEVEL TASK ID | LOW-LEVEL TASK ID |
|---|---|---|
| 0256 | 0128 | 0512 |
| 0512 | 0256, 0250 | 1024, 1050 |
| 1024 | 0512 | 2048 |
| 2048 | 1024 | 4096 |
| ... | ... | ... |

FIG. 4

| TASK ID | USER | ACCESS RIGHT |
|---|---|---|
| 1024 | YAMAMOTO | VIEWING, EDITING, DELETING |
| | TAKAHASHI | VIEWING |
| 1500 | TANAKA | VIEWING, EDITING, DELETING |
| ... | ... | ... |

FIG. 9

| DELETED-TASK ID | RELEVANT INFORMATION VIEW-AUTHORIZED PERSON |
|---|---|
| 1024 | YAMAMOTO |
| 1024 | TAKAHASHI |
| 1500 | TANAKA |
| ... | ... |

FIG. 10

| DELETED-TASK ID | REDIRECT DESTINATION |
|---|---|
| 1024 | HIGH-LEVEL TASK |
| 1500 | REGISTRATION DESTINATION OF RESULT |
| ... | ... |

FIG. 11

| DELETED-TASK ID | TYPE OF RELEVANT INFORMATION | NAME OF RELEVANT INFORMATION | URL | REDIRECT DESTINATION URL |
|---|---|---|---|---|
| 1024 | HIGH-LEVEL TASK | TASK A | ... | ... |
| 1024 | LOW-LEVEL TASK | TASK B | ... | ... |
| 1024 | OTHER TASK | TASK C | ... | ... |
| 1500 | REGISTRATION DESTINATION OF RESULT | FOLDER A | ... | ... |
| ... | ... | ... | ... | ... |

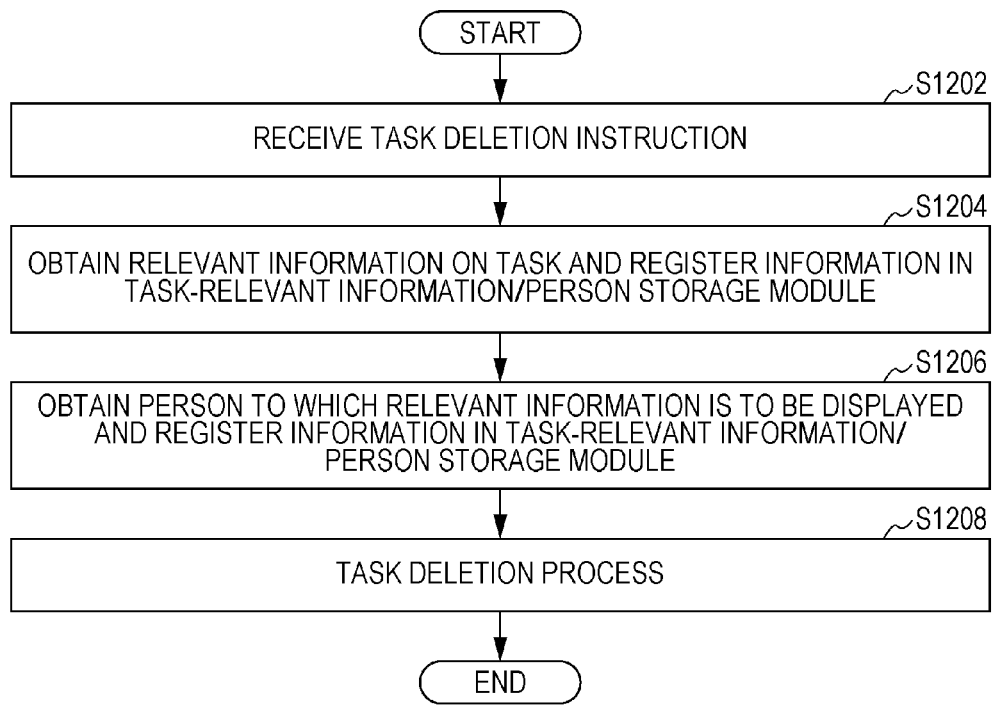
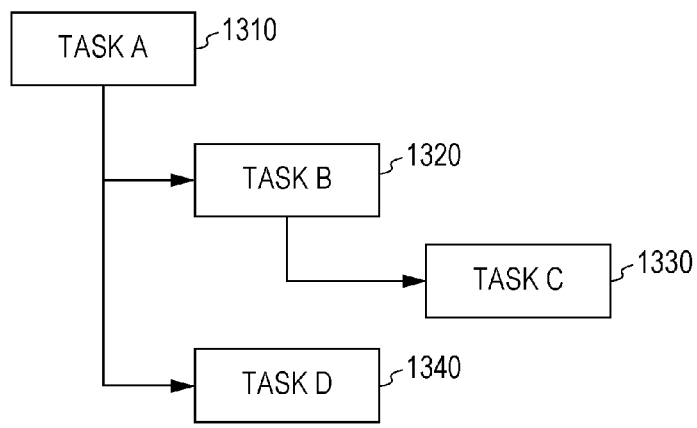

US 8,788,537 B2

COMPUTER READABLE MEDIUM STORING INFORMATION PROCESSING PROGRAM, INFORMATION PROCESSING APPARATUS, AND INFORMATION PROCESSING METHOD

CROSS-REFERENCE TO RELATED APPLICATIONS

This application is based on and claims priority under 35 USC 119 from Japanese Patent Application No. 2010-127693 filed Jun. 3, 2010.

BACKGROUND (i) Technical Field

The present invention relates to a computer readable medium storing an information processing program, an information processing apparatus, and an information processing method.

(ii) Related Art

Techniques for processing deleted information have been available.

SUMMARY

According to an aspect of the invention, there is provided a computer readable medium storing an information processing program causing a computer to execute a process including receiving an instruction for deleting an information group including pieces of information from a first memory, the first memory storing a plurality of information groups and structure information indicating a structure of parent-child relationship between a first information group and a second information group, the first information group and the second information group being included in the plurality of information groups; extracting information regarding parent-child-relationship information groups from the first memory, the parent-child-relationship information groups being information groups having a structure of parent-child relationship with a deletion target information group, the deletion target information group being an information group to be deleted in accordance with the received instruction; extracting a user identification code associated with the deletion target information group from a second memory, the second memory storing, in association with each other, an information group identification code uniquely identifying an information group, and a user identification code uniquely identifying a user who has a right to perform an operation on the information group; storing an information group identification code of the deletion target information group, the information regarding the parent-child-relationship information groups, and the extracted user identification code in association with one another in a third memory; deleting the deletion target information group from the first memory; and changing the structure information stored in the first memory to structure information obtained after the deletion target information group has been deleted from the first memory, by changing one of the parent-child-relationship information groups that is a child of the deletion target information group as a child information group of another of the parent-child-relationship information groups that is a parent of the deletion target information group.

BRIEF DESCRIPTION OF THE DRAWINGS

Exemplary embodiment(s) of the present invention will be described in detail based on the following figures, wherein:

FIG. 3 illustrates an example data structure of a task structure table;

FIG. 4 illustrates an example data structure of an access right table;

FIG. 9 illustrates an example data structure of a relevant information view-authorized person table;

FIG. 10 illustrates an example data structure of a redirect destination table;

FIG. 11 illustrates an example data structure of a relevant information/redirect destination table;

FIG. 12 is a flowchart illustrating an example process performed by the deleted task management module;

FIG. 13 illustrates an example structure of tasks before the deletion of a task;

DETAILED DESCRIPTION

Examples of an exemplary embodiment of the present invention will be described hereinafter with reference to the drawings.

Figure 1:
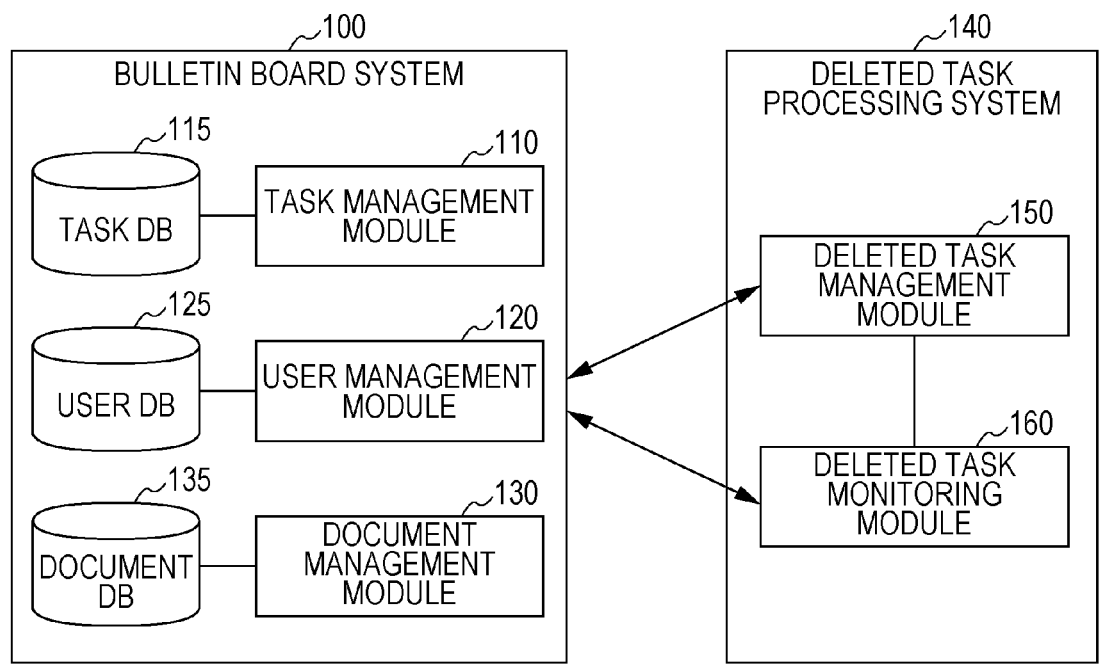
FIG. 1 is a conceptual module configuration diagram of an example overall configuration of an exemplary embodiment.

FIG. 1 is a conceptual module configuration diagram of an example overall configuration of the exemplary embodiment.

The term "module" generally refers to a logically separable part of software (computer program), hardware, or the like. Therefore, the term "module" as used in this exemplary embodiment refers to not only a module in a computer program but also a module in a hardware configuration. Thus, this exemplary embodiment will be described in the context of a computer program for providing functions of modules (a program for causing a computer to execute individual procedures, a program for causing a computer to function as individual functions, a program for causing a computer to realize individual functions), a system, and a method. While "storing", "being stored", and equivalent terms are used for convenience of description, such terms indicate, when the exemplary embodiment relates to a computer program, storing of the computer program in a storage device or performing of control to store the computer program in a storage device.

Furthermore, modules and functions may have a one-to-one correspondence. In terms of implementation, one module may be composed of one program, plural modules may be composed of one program, or, conversely, one module may be composed of plural programs. Additionally, plural modules may be executed by a single computer, or a single module may be executed by plural computers in a distributed or parallel environment. One module may include another module. Further, hereinafter, the term "connection" includes physical connection and logical connection (such as exchanging data, issuing an instruction, and cross-reference between data items). The term "predetermined" means "determined before" the performance of a desired process, and may include "determined before" the start of a process according to the exemplary embodiment, and "determined before" the performance of a desired process even after the start of a process according to the exemplary embodiment, in accordance with the current state and condition or in accordance with the previous state and condition.

Furthermore, the term "system or apparatus" includes a configuration in which plural computers, hardware components, devices, or other suitable elements are connected to one another via a communication medium such as a network (including a one-to-one communication connection), and what is implemented by a single computer, hardware component, device, or suitable element. The terms "apparatus" and "system" are used as synonymously. It is to be understood that the term "system" does not include what is merely a social "mechanism" (social system) based on artificial rules.

Moreover, desired information is read from a storage device for each process performed by an individual module or, if plural processes are performed within a module, for each of the plural processes, and is processed. The process result is written in the storage device. Therefore, reading information from the storage device before processing the information and writing information to the storage device after processing the information may not necessarily be described herein. The term "storage device", as used herein, may include a hard disk, a random access memory (RAM), an external storage medium, a storage device using a communication line, and a register in a central processing unit (CPU).

An information processing apparatus will be described hereinafter in the context of a deleted task processing system 140 configured to operate in association with a bulletin board system 100, by way of example. The deleted task processing system 140 may be connected to the bulletin board system 100 via a communication line, or may be included in the bulletin board system 100.

The bulletin board system 100 may be used to allow users in a team to share information collected by individual users.

Further, in the following description, an information group including pieces of information may be a task, by way of example. The term "task" means an information group generated for each team including plural users who work together, and may include pieces of information such as messages directed to users, reports of activities, and interactive communication between users. The above pieces of information are received by the bulletin board system 100 in accordance with an operation performed by a user, and the bulletin board system 100 presents the received pieces of information to a terminal operated by a user.

A task may include position information linking to other information. A task may include the so-called information defining a link relationship (hereinafter also referred to as "link information"), such as the Uniform Resource Locator (URL) of a task relevant to the task, the document name of an electronic document relating to the work of a team, and the URL of a folder. The term "folder" refers to an area of a logical memory or virtual memory used for document categorization. Here, a folder may have a tree structure, and may be used for file management and any other purpose. A folder which may be assigned a unique name has attribute information. A folder may have a folder (called a "child folder", "sub-folder", or the like), which represents a tree structure of file management. A similar concept of a folder may also be expressed as a "directory".

The bulletin board system 100 is connected to a deleted task management module 150 and a deleted task monitoring module 160 in the deleted task processing system 140, and includes a task management module 110, a task database (DB) 115, a user management module 120, a user DB 125, a document management module 130, and a document DB 135.

The task management module 110 is connected to the task DB 115, and manages tasks stored in the task DB 115. The term "management", as used herein, means, depending on the context, control, management, storage of data for control or management, and represents the role or operation of these actions.

The task DB 115 is accessed from the task management module 110, and stores plural tasks supported in the bulletin board system 100. Further, the task DB 115 stores plural tasks and structure information indicating the structure of parent-child relationship between a first task and a second task that are included in the plural tasks. The term "parent-child relationship" means the relationship between a parent and a child, and may include the relationship between siblings (tasks that share the same parent and that are in parallel with the target task). A specific example of the structure information will be described below using an example in FIG. 3.

The user management module 120 is connected to the user DB 125, and manages users who have an operation right for the tasks stored in the task DB 115, documents stored in the document DB 135, and the like.

The user DB 125 is accessed from the user management module 120, and stores, in association with each other, a task identification (ID) uniquely identifying a task and a user ID uniquely identifying a user who has an operation right that is a privilege to perform an operation on the task. A specific example of the correspondence between task IDs and user IDs will be described below using an example in FIG. 4.

A document ID uniquely identifying a document and/or a folder ID uniquely identifying a folder may also be stored in association with the user ID of a user who has an operation right that is a privilege to perform an operation on the document and/or the folder.

The term "operation right" (or "access right") in the phrase "an operation right that is a privilege to perform an operation on a task, a folder, or a document" defines a subject (such as, for example, a user or a group including plural users) that is allowed to perform a predetermined operation (such as editing or viewing) on a task or the like, and control may be performed so that only the subject is allowed to perform the operation on the task or the like. In a specific example implementation, an operation that a user is allowed to perform on a task or the like may be associated with the user. Therefore, a user who has an operation right is authorized to perform an operation on a task or the like when he/she wishes to do so.

The document management module 130 is connected to the document DB 135, and manages documents, folders, and other suitable elements stored in the document DB 135.

The document DB 135 is accessed from the document management module 130, and stores documents, folders, and other suitable elements.

Figure 2:
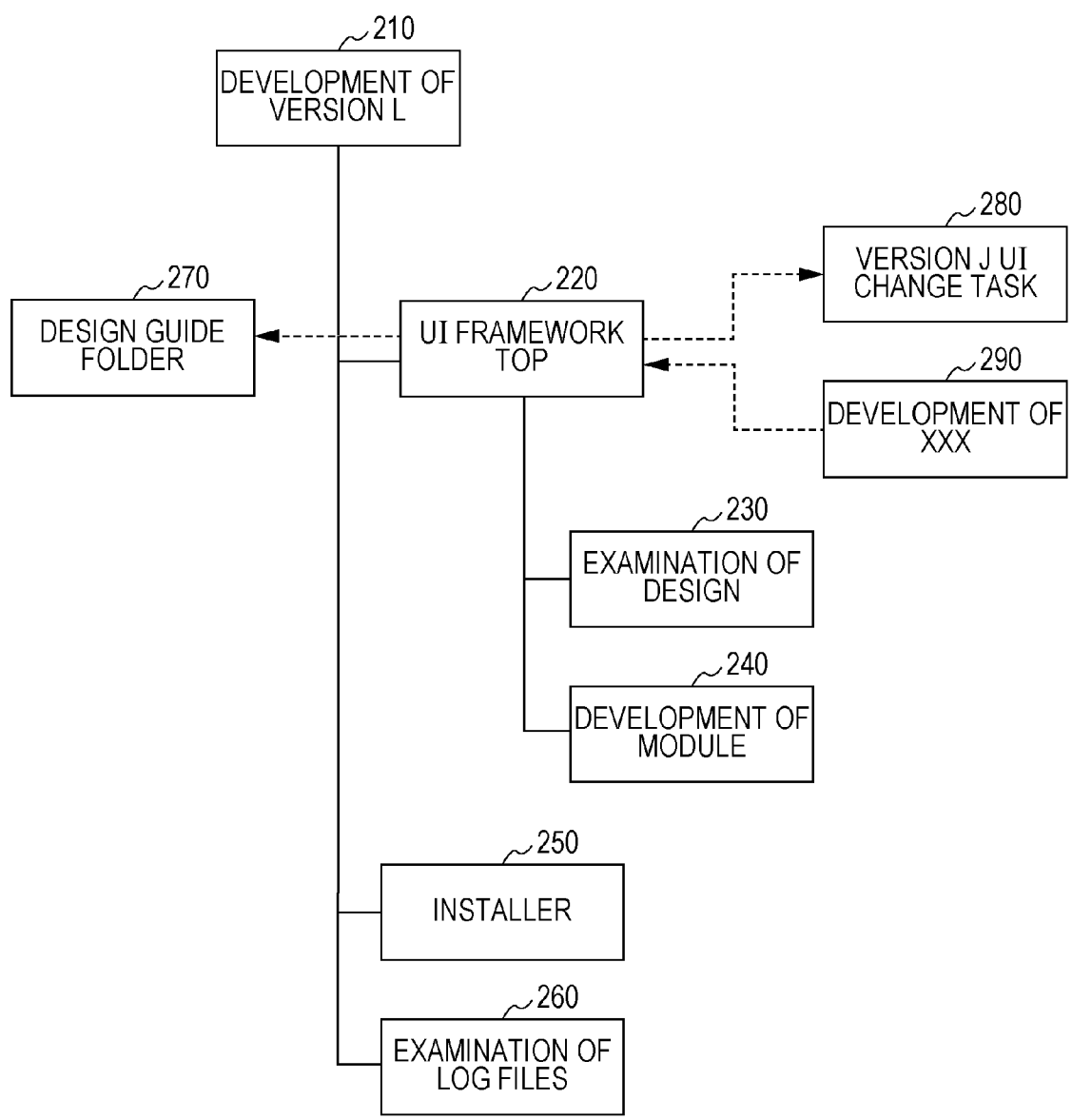
FIG. 2 illustrates an example relationship between tasks and folders.

FIG. 2 illustrates an example relationship between tasks and folders. The tasks are stored in the task DB 115, and the folders are stored in the document DB 135. In the example in FIG. 2, a design guide folder 270 is an example of a folder, and others (i.e., a "development of version L" 210, a "UI framework top" 220, an "examination of design" 230, a "development of module" 240, an "installer" 250, an "examination of log files" 260, a "version J UI change task" 280, and a "development of XXX" 290) are examples of tasks.

The tasks have a parent-child relationship. In the example in FIG. 2, the "development of version L" 210 is a parent task, and the "UI framework top" 220, the "installer" 250, and the "examination of log files" 260 are child tasks. Further, the "UI framework top" 220 is a parent task, and the "examination of design" 230 and the "development of module" 240 are child tasks.

There are also link relationships between tasks and between a task and a folder. In the example in FIG. 2, the "UI framework top" 220 has links to the design guide folder 270 and the "version J UI change task" 280. Further, the "development of XXX" 290 has a link to the "UI framework top" 220.

A data structure for implementing a structure according to this exemplary embodiment may be a data structure that defines a parent-child relationship, and, for example, a tree-based data structure in which a task ID uniquely identifying a task that is a parent and the task ID of a task that is a child are stored in association with each other may be used.

FIG. 3 illustrates an example data structure of a task structure table 300. The task structure table 300 includes a "task ID" column 310, a "high-level task ID" column 320, and a "low-level task ID" column 330. The "task ID" column 310 stores the task ID of a target task. The "high-level task ID" column 320 stores the task ID of a task that is a parent of the target task. Plural parent tasks may exist. The "low-level task ID" column 330 stores the task ID of a task that is a child of the target task. Plural child tasks may exist.

Another example of the data structure for implementing a link relationship may be a data structure in which the task identification code of the reference source and the task identification code of the reference destination are stored as a pair.

In addition to a link relationship between tasks, a link relationship between a task and a folder, a link relationship between a task and an electronic document, or a link relationship between a folder and a document may also be used.

FIG. 4 illustrates an example data structure of an access right table 400. The access right table 400 includes a "task ID" column 410, a "user" column 420, and an "access right" column 430. The "task ID" column 410 stores the task ID of the target task. The "user" column 420 stores the user ID of a user who has an access right for the task. In the example in FIG. 4, a user name is stored as a user ID. However, a user number or the like capable of uniquely identifying a user may be used. The "access right" column 430 stores access rights of the user for the task. Examples of the access rights include a viewing right, an editing right, and a deleting right. In the first row of the table in the example in FIG. 4, Mr. Yamamoto has the right to view, edit, and delete the task with task ID "1024".

The deleted task processing system 140 includes a deleted task management module 150 and a deleted task monitoring module 160, and performs a process for deleting a task and a process relating to the deleted task.

The deleted task management module 150 is connected to the bulletin board system 100 and the deleted task monitoring module 160, and deletes a task stored in the task DB 115. In this case, the deleted task management module 150 extracts information relevant to a task having a structure of parent-child relationship with the task to be deleted. The deleted task management module 150 also extracts link information included in the task to be deleted. The module configuration, the process, and the like of the deleted task management module 150 will be described in detail below with reference to an example in FIGS. 5 to 14.

The deleted task monitoring module 160 is connected to the bulletin board system 100 and the deleted task management module 150. When a task is presented to a user, if the task is a deleted task and the user has an access right, the deleted task monitoring module 160 presents information regarding a task having a structure of parent-child relationship with the deleted task to the user. The deleted task monitoring module 160 also presents link information included in the task to be deleted to the user. The module configuration, the process, and the like of the deleted task monitoring module 160 will be described in detail using an example in FIGS. 15 to 19.

Figure 5:
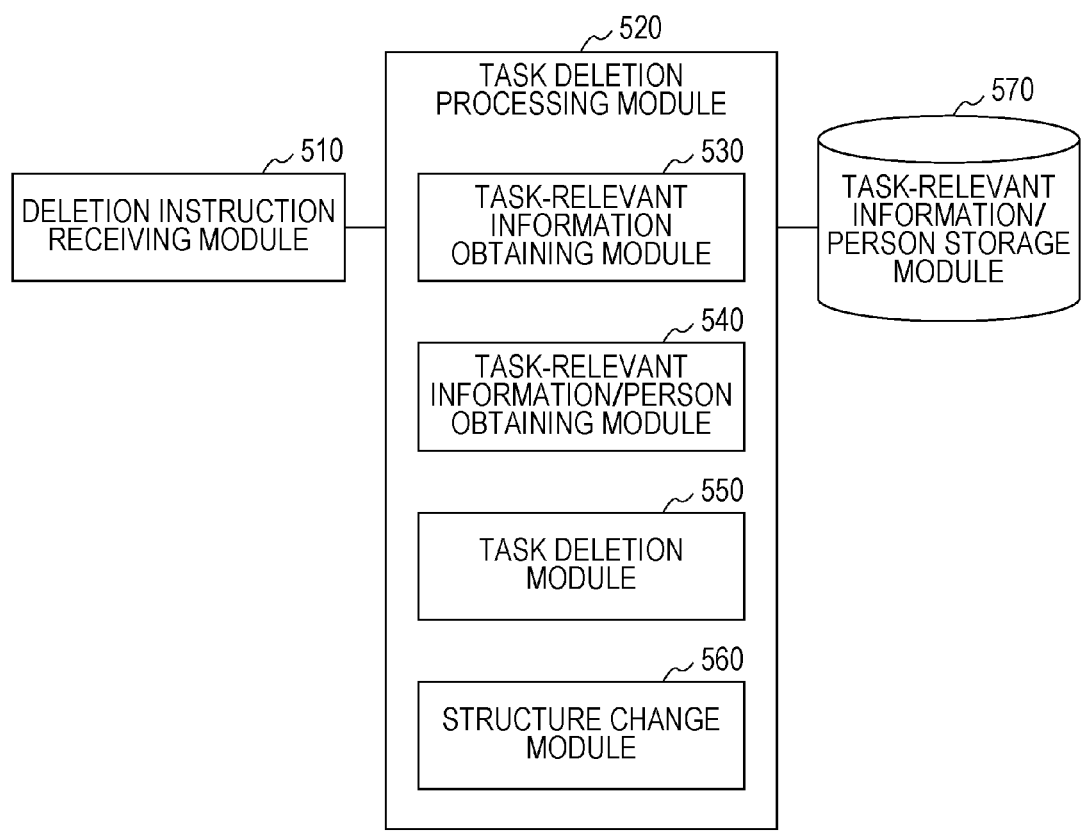
FIG. 5 is a conceptual module configuration diagram of an example configuration of a deleted task management module according to this exemplary embodiment.
Figure 6:
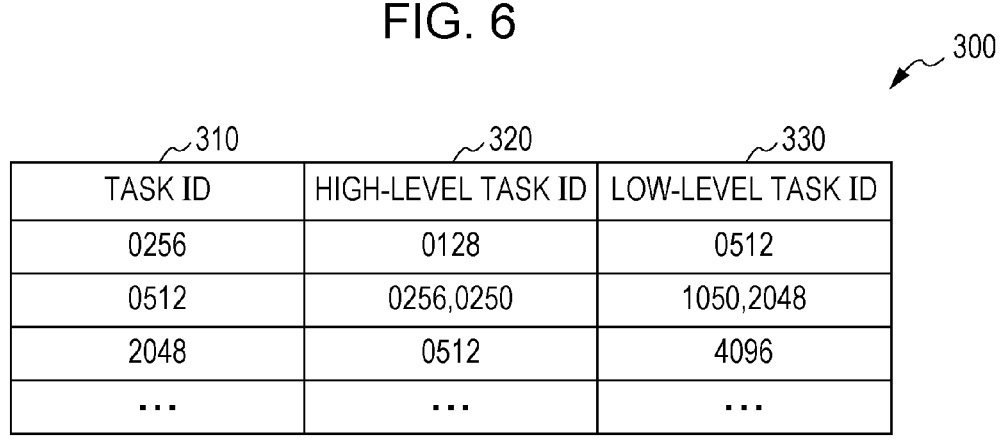
FIG. 6 illustrates an example of a task structure table obtained after a task has been deleted.

FIG. 5 is a conceptual module configuration diagram of an example configuration of the deleted task management module 150 according to this exemplary embodiment. The deleted task management module 150 includes a deletion instruction receiving module 510, a task deletion processing module 520, and a task-relevant information/person storage module 570.

The deletion instruction receiving module 510 is connected to the task deletion processing module 520, and receives an instruction for deleting a task stored in the task DB 115. The deletion of a task may be performed in accordance with an operation performed by a user (for example, an instruction for deleting a task) or may be performed by the deleted task management module 150 in accordance with a predetermined algorithm. Specific examples of the predetermined algorithm include an algorithm under which the date and time of access to a task is stored and the task is deleted if no access is performed for a predetermined period of time or longer. In another algorithm, the frequency with which a task is written or accessed may be measured for a predetermined period of time, and the task may be deleted when the measurement result becomes less than a predetermined value. Other algorithms may be used such as an algorithm under which it is determined whether or not a predetermined time limit of storage of a task has expired and the task is deleted if the time limit has expired.

The task deletion processing module 520 is connected to the deletion instruction receiving module 510 and the task-relevant information/person storage module 570, and includes a task-relevant information obtaining module 530, a task-relevant information/person obtaining module 540, a task deletion module 550, and a structure change module 560.

The task-relevant information obtaining module 530 extracts, based on a task to be deleted in accordance with an instruction received by the deletion instruction receiving module 510, information relevant to a task having a structure of parent-child relationship with the task from the task DB 115 of the bulletin board system 100. That is, information relevant to a task having a structure of parent-child relationship with a task to be deleted in accordance with an instruction received by the deletion instruction receiving module 510 is extracted from the task DB 115. Examples of the "information relevant to a task" include the task ID of the task, the type of the task (for example, the relationship (such as parent, child, or sibling) between a deleted task and the task), and the URL at which the task is stored. Further, the task IDs in the "high-level task ID" column 320 and the "low-level task ID" column 330 with respect to the task ID of a deleted task are extracted from the task structure table 300 illustrated by way of example in FIG. 3. The tasks stored in the "high-level task ID" column 320 have a parent relationship with the tasks stored in the "task ID" column 310, and the tasks stored in the "low-level task ID" column 330 have a child relationship with the tasks stored in the "task ID" column 310. Thus, the type of a task is extracted in accordance with whether the task is stored in the "high-level task ID" column 320 or the "low-level task ID" column 330.

Furthermore, the task-relevant information obtaining module 530 may extract, based on a task to be deleted in accordance with an instruction received by the deletion instruction receiving module 510, link information included in the task from the task DB 115 of the bulletin board system 100. That is, link information included in a task to be deleted that is stored in the task DB 115 may be extracted. For example, the task may be searched (or scanned), and link information included therein may be extracted.

The task-relevant information/person obtaining module 540 extracts a user ID associated with a task to be deleted in accordance with an instruction received by the deletion instruction receiving module 510 from the user DB 125 of the bulletin board system 100. Specifically, for example, the user ID of a user who has a certain access right for the deleted task is extracted. For example, a user associated with the task ID of a deleted task is extracted from the access right table 400 illustrated by way of example in FIG. 4.

The task deletion module 550 deletes a task to be deleted in accordance with an instruction received by the deletion instruction receiving module 510 from the task DB 115 of the bulletin board system 100.

Figure 7:
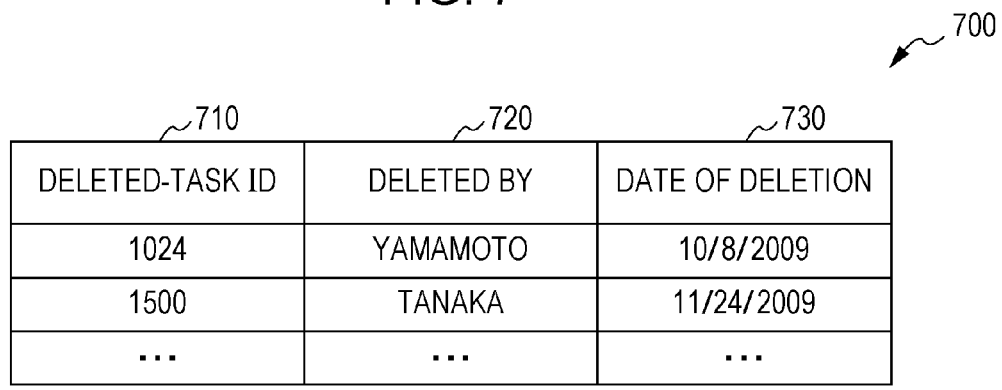
FIG. 7 illustrates an example data structure of a deleted task table.

The task deletion module 550 further stores, in association with one another in the task-relevant information/person storage module 570, the task ID of the deleted task, the user ID of a user who has issued an instruction for deleting the task, a relevant document, and the year, month, and day of deletion (which may also include hour, minute, and second). For example, items may be stored in association in a manner similar to a deleted task table 700. FIG. 7 illustrates an example data structure of the deleted task table 700. The deleted task table 700 includes a "deleted-task ID" column 710, a "deleted by" column 720, and a "date of deletion" column 730. The "deleted-task ID" column 710 stores the task ID of a task to be deleted in accordance with an instruction received by the deletion instruction receiving module 510 (task ID of a deleted task). The "deleted by" column 720 stores the user ID of a user who has issued an instruction for deleting the task. If the task has been deleted using the predetermined algorithm described above, an identification code uniquely identifying the algorithm or a system that has deleted the task is stored. The "date of deletion" column 730 stores the year, month, and day of deletion of the task (which may also include hour, minute, and second).

Figure 8:
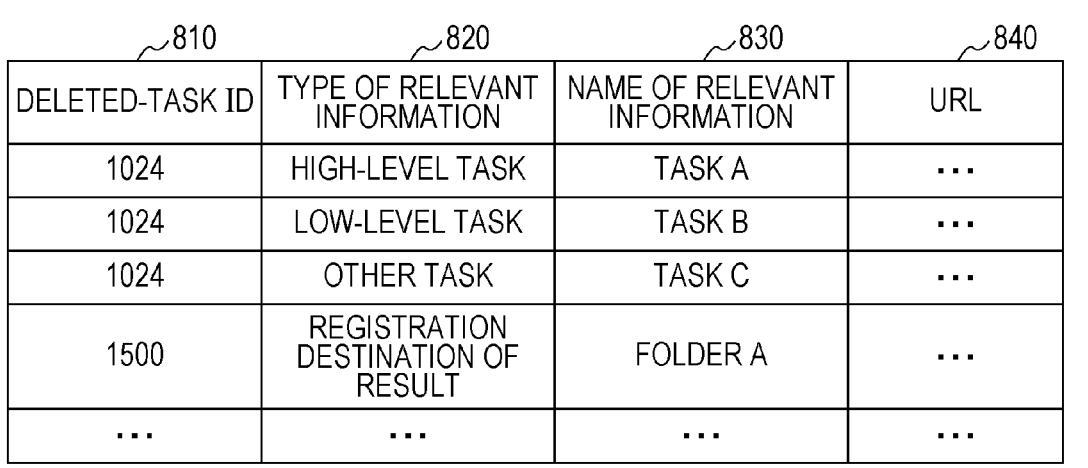
FIG. 8 illustrates an example data structure of a relevant information table.

The task deletion module 550 stores the information extracted by the task-relevant information obtaining module 530 (which includes at least the task ID of the deleted task, and information relevant to a task having a structure of parent-child relationship with the task and which may include link information) in the task-relevant information/person storage module 570. For example, items may be stored in association in a manner similar to a relevant information table 800. FIG. 8 illustrates an example data structure of the relevant information table 800. The relevant information table 800 includes a "deleted-task ID" column 810, a "type of relevant information" column 820, a "name of relevant information" column 830, and a "URL" column 840. The "deleted-task ID" column 810 stores the task ID of a task to be deleted in accordance with an instruction received by the deletion instruction receiving module 510 (the task ID of a deleted task). The "type of relevant information" column 820 stores the type of a task having a structure of parent-child relationship with the deleted task or the type of link destination information included in the deleted task. In the "type of relevant information" column 820, a "high-level task" represents a task that is a parent of the deleted task, a "low-level task" represents a task that is a child of the deleted task, and an "other task" represents a task having a relationship other than a parent-child relationship, such as a sibling relationship, with the deleted task. The "type of relevant information" column 820 also includes, if the link destination is a folder, "registration destination of result" or the like indicating that type of the folder, that is, the folder is a folder storing a document and the like generated in the task. The "name of relevant information" column 830 stores the name of a task having a structure of parent-child relationship with a deleted task or the name of link destination information included in the deleted task. The "URL" column 840 stores the URL of a task having a structure of parent-child relationship with a deleted task or the URL of link destination information included in the deleted task. The task ID, instead of the URL, of the task may be stored.

The task deletion module 550 stores the information extracted by the task-relevant information/person obtaining module 540 (the task ID of a deleted task, and the user ID of a user who has an access right for the task) in the task-relevant information/person storage module 570. For example, items may be stored in association in a manner similar to a relevant information view-authorized person table 900. FIG. 9 illustrates an example data structure of the relevant information view-authorized person table 900. The relevant information view-authorized person table 900 includes a "deleted-task ID" column 910 and a "relevant information view-authorized person" column 920. The "deleted-task ID" column 910 stores the task ID of a task to be deleted in accordance with an instruction received by the deletion instruction receiving module 510 (task ID of a deleted task). The "relevant information view-authorized person" column 920 stores a user name serving as the user ID of a user who has a certain access right for the deleted task.

While the relevant information table 800 and the relevant information view-authorized person table 900 are separately provided, they may be combined with each other. For example, the "relevant information view-authorized person" column 920 may be added to the relevant information table 800 so as to store a user name serving as the user ID of a user who has a certain access right for the task corresponding to the task ID of the deleted task in the "deleted-task ID" column 810. Furthermore, conversely, a table that does not include a column such as the "name of relevant information" column 830 may be used.

Alternatively, the task deletion module 550 may store information relevant to a task and link information as different tables in the task-relevant information/person storage module 570. That is, one table may be a table including information relevant to a task having a parent-child relationship with a deleted task, and the other table may be a table including link information included in the deleted task. The data structure of the tables may be equivalent to that of the relevant information table 800 illustrated in the example of FIG. 8.

In addition, the task deletion module 550 may store a destination to which a deleted task is redirected in association with the deleted task in the task-relevant information/person storage module 570. The term "redirect", as used herein, refers to access to a redirect destination in response to access to a deleted task. For example, redirect destinations may be stored in association in a manner similar to a redirect destination table 1000. FIG. 10 illustrates an example data structure of the redirect destination table 1000. The redirect destination table 1000 includes a "deleted-task ID" column 1010 and a "redirect destination" column 1020. The "deleted-task ID" column 1010 stores the task ID of a task to be deleted in accordance with an instruction received by the deletion instruction receiving module 510 (task ID of a deleted task). The "redirect destination" column 1020 stores a source that has accessed the deleted task. For example, for a "high-level task", the URL of a high-level task of the deleted task is extracted from the relevant information table 800, and is accessed. Further, for a "registration destination of result", the URL of a destination to which the result is registered, which is a folder to which the deleted task is linked is extracted from the relevant information table 800, and is accessed.

In place of a data structure such as the redirect destination table 1000, a relevant information/redirect destination table 1100 may be used in which the URL of a redirect destination is stored. FIG. 11 illustrates an example data structure of the relevant information/redirect destination table 1100. The relevant information/redirect destination table 1100 includes a "deleted-task ID" column 1110, a "type of relevant information" column 1120, a "name of relevant information" column 1130, a "URL" column 1140, and a redirect destination "URL" column 1150. The "deleted-task ID" column 1110, the "type of relevant information" column 1120, the "name of relevant information" column 1130, and the "URL" column 1140 may be equivalent to the "deleted-task ID" column 810, the "type of relevant information" column 820, the "name of relevant information" column 830, and the "URL" column 840 in the relevant information table 800 illustrated by way of example in FIG. 8, respectively. The redirect destination "URL" column 1150 stores the URL of a redirect destination corresponding to a deleted task. In response to access to the deleted task, the URL of the redirect destination is accessed.

The structure change module 560 changes the structure information stored in the task DB 115 of the bulletin board system 100 to the structure information obtained after deletion. The structure information stored in the task DB 115 may be changed to structure information obtained after a task has been deleted by the task deletion module 550 (hereinafter also referred to as a "deleted task") has been deleted from the task DB 115, by changing a task that is a child of a task to be deleted as a child task of a task that is a parent of the deleted task. More specifically, for example, the structure information on a deleted task is deleted, the task ID of a deleted task registered as a child task of a parent task of the deleted task is deleted, the task ID of a child task of the deleted task is registered as a child task of the parent task, the task ID of a deleted task registered as a parent task of the child task of the deleted task is deleted, and the task ID of the parent task of the deleted task is registered as a parent task of the child task. A case where in the task structure table 300 illustrated in the example of FIG. 3, a task with the task ID "1024" in the third row has been deleted will be described using the task structure table 300 in the example of FIG. 6. First, the task ID "0512" of the parent task and the task ID "2048" of the child task of the deleted task are extracted. The third row in the task structure table 300 illustrated in FIG. 3 is deleted. Then, "1024" is deleted from the "low-level task ID" column 330 in the row of the task ID "0512" of the parent task, and the task ID "2048" of the child task is stored instead. Next, "1024" is deleted from the "high-level task ID" column 320 in the row of the task ID "2048" of the child task, and the task ID "0512" of the parent task is stored instead.

The task-relevant information/person storage module 570 is connected to the task deletion processing module 520, and stores, in association with one another, the task ID of a task to be deleted in accordance with an instruction received by the deletion instruction receiving module 510, information relevant to a task extracted by the task-relevant information obtaining module 530, and a user ID extracted by the task-relevant information/person obtaining module 540.

The task-relevant information/person storage module 570 may also store, in association with one another, the task ID of a task to be deleted in accordance with an instruction received by the deletion instruction receiving module 510, information relevant to a task extracted by the task-relevant information obtaining module 530, link information extracted by the task-relevant information obtaining module 530, and a user ID extracted by the task-relevant information/person obtaining module 540.

For example, the task-relevant information/person storage module 570 stores the deleted task table 700, the relevant information table 800 (including the "type of relevant information" column 820 that only contains tasks), the relevant information view-authorized person table 900, the combination of the relevant information table 800 and the relevant information view-authorized person table 900, the redirect destination table 1000, the relevant information/redirect destination table 1100, and any other suitable table.

FIG. 12 is a flowchart illustrating an example process performed by the deleted task management module 150.

In step S1202, the deletion instruction receiving module 510 receives an instruction for deleting a task in accordance with an operation performed by a user or a predetermined algorithm.

In step S1204, the task-relevant information obtaining module 530 obtains task-relevant information corresponding to the task to be deleted (information relevant to the task, link information). Then, the task deletion module 550 registers the obtained information in the task-relevant information/person storage module 570.

In step S1206, the task-relevant information/person obtaining module 540 obtains a person to which relevant information corresponding to the task to be deleted is to be displayed. Then, the task deletion module 550 registers the obtained information in the task-relevant information/person storage module 570.

In step S1208, the task deletion module 550 performs a task deletion process. Then, the structure change module 560 changes the current structure information to structure information on tasks obtained after deletion.

FIG. 13 illustrates an example structure of tasks before the deletion of a task. A task A 1310 is a parent task, and a task B 1320 and a task D 1340 are child tasks. Further, the task B 1320 is a parent task, and a task C 1330 is a child task.

Figure 14:
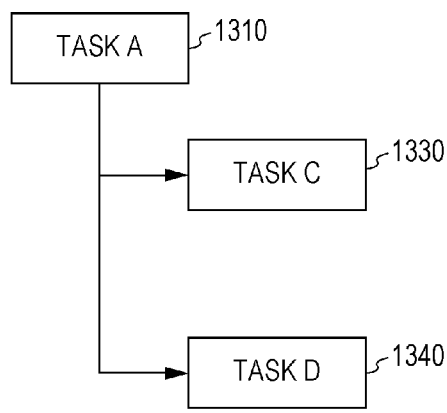
FIG. 14 illustrates an example structure of tasks after the deletion of a task.

Here, it is assumed that the task B 1320 has been deleted. FIG. 14 illustrates an example structure of tasks obtained after the deletion of a task. The task A 1310 is a parent task, and the task C 1330 and the task D 1340 are child tasks. That is, since the task B 1320 has been deleted, the task C 1330 that is a child of the task B 1320 is a child of the task A 1310.

Figure 15:
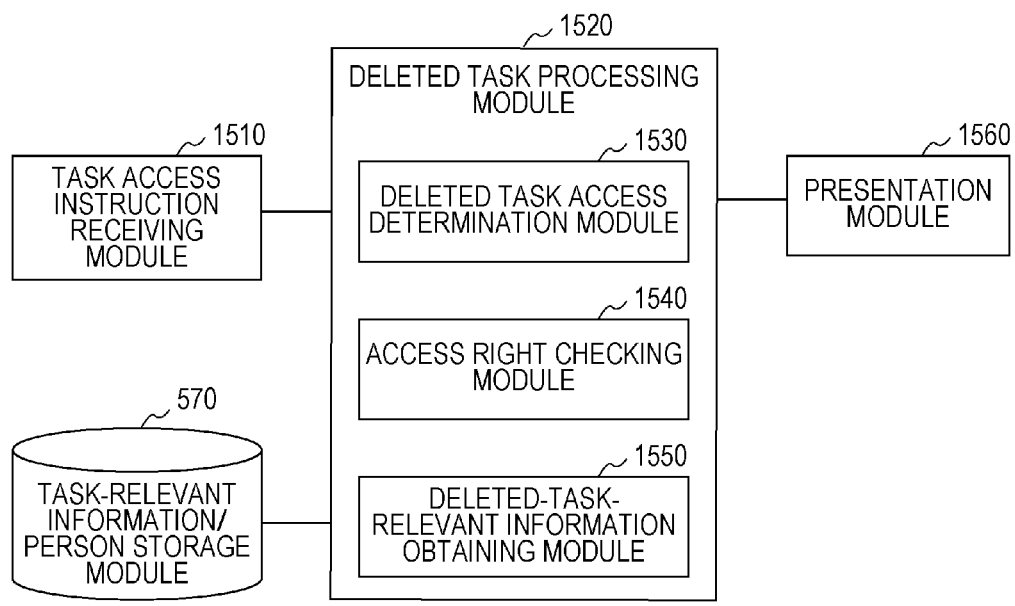
FIG. 15 is a conceptual module configuration diagram of an example configuration of a deleted task monitoring module according to this exemplary embodiment.

FIG. 15 is a conceptual module configuration diagram of an example configuration of the deleted task monitoring module 160 according to this exemplary embodiment. The deleted task monitoring module 160 includes a task access instruction receiving module 1510, a deleted task processing module 1520, a presentation module 1560, and a task-relevant information/person storage module 570.

The task access instruction receiving module 1510 is connected to the deleted task processing module 1520, and receives an instruction for reading a task in accordance with a user operation. Examples of the instruction for reading a task include an instruction for presenting the content of the task to a user, and an instruction for presenting the relationship between tasks and between a task and a folder, as illustrated in the examples of FIGS. 2 and 14.

The deleted task processing module 1520 is connected to the task access instruction receiving module 1510, the presentation module 1560, and the task-relevant information/person storage module 570, and includes a deleted task access determination module 1530, an access right checking module 1540, and a deleted-task-relevant information obtaining module 1550.

The deleted task access determination module 1530 determines whether or not the task ID of a task to be read in accordance with an instruction received by the task access instruction receiving module 1510 has been stored in the task-relevant information/person storage module 570. That is, the deleted task access determination module 1530 determines whether or not a task to be read is a task that has already been deleted. Specifically, for example, the deleted task access determination module 1530 determines whether or not the "deleted-task ID" column 810 in the relevant information table 800 contains the task ID of a task to be read.

If the deleted task access determination module 1530 determines that the task ID of a task to be read in accordance with the instruction received by the task access instruction receiving module 1510 has been stored in the task-relevant information/person storage module 570, the access right checking module 1540 checks that the user ID of a user who has performed an operation received by the task access instruction receiving module 1510 has been stored in association with the task in the task-relevant information/person storage module 570. That is, the access right checking module 1540 checks that the user has a certain access right for the task to be read. Specifically, for example, the access right checking module 1540 checks that the "relevant information view-authorized person" column 920 with respect to the task ID of the task to be read in the relevant information view-authorized person table 900 contains the user ID of the user who has issued the instruction.

The user ID of the user who has performed the operation received by the task access instruction receiving module 1510 is detected using a detection module that detects a user ID. For example, the user ID of a user who logs in to the information processing apparatus may be detected, or the user ID stored in an IC card owned by the user may be detected.

If the access right checking module 1540 determines that the user ID has been stored in association with the deleted task in the task-relevant information/person storage module 570, the deleted-task-relevant information obtaining module 1550 extracts information relevant to a task having a structure of parent-child relationship with the task from the task-relevant information/person storage module 570. Further, if the access right checking module 1540 determines that the user ID has been stored in association with the deleted task in the task-relevant information/person storage module 570, the deleted-task-relevant information obtaining module 1550 extracts position information for linking to other information included in the deleted task from the task-relevant information/person storage module 570.

The presentation module 1560 is connected to the deleted task processing module 1520, and presents information relevant to the task extracted by the deleted-task-relevant information obtaining module 1550. For example, information on a task having a parent-child relationship with the deleted task may be displayed on a display device such as display. The presentation module 1560 may also present the position information for linking to other information, which is extracted by the deleted-task-relevant information obtaining module 1550.

Figure 17:
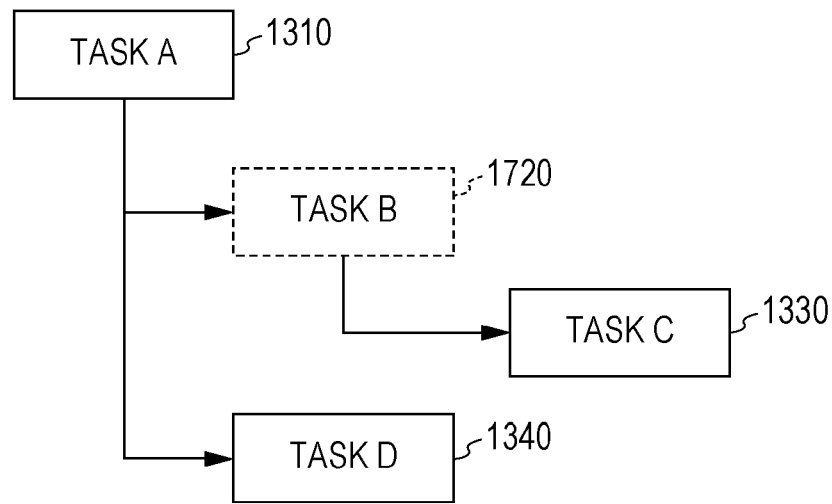
FIG. 17 illustrates an example of presentation in response to access to a deleted task.
Figure 18:
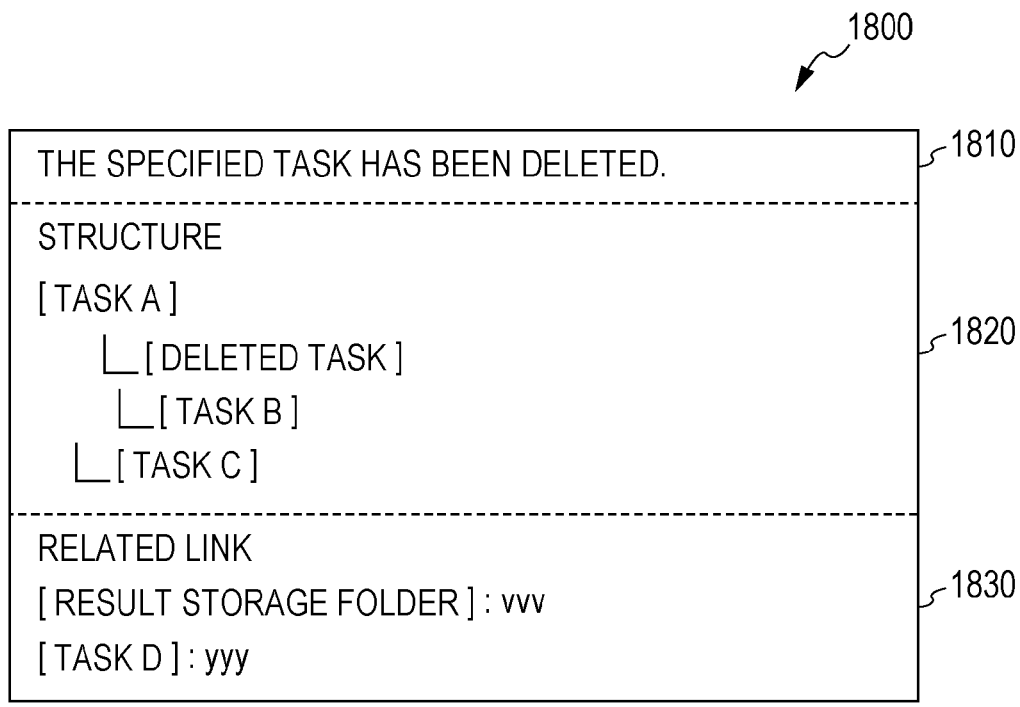
FIG. 18 illustrates an example of presentation in response to access to a deleted task.

More specifically, as illustrated by way of example in FIG. 17, a deleted task (i.e., the deleted task B 1720) may be displayed so as to be surrounded by a dotted line. The example in FIG. 17 is an example graphical representation of the task A 1310 and sub-tasks by a user who has a certain access right for the deleted task B 1320 in the example in FIG. 14. Further, in response to access to the deleted task, as illustrated by way of example in FIG. 18, a message "the specified task has been deleted" may be presented in a presentation area 1810 on a presentation screen 1800, and a task having a parent-child relationship with the deleted task may be presented in the presentation area 1820 together with the structure of the tasks. Additionally, link information (such as the URL of a folder in which the result is stored and to which the task is linked, or the URL of a task to which the task is linked) included in the deleted task may be presented in the presentation area 1830.

Figure 19:
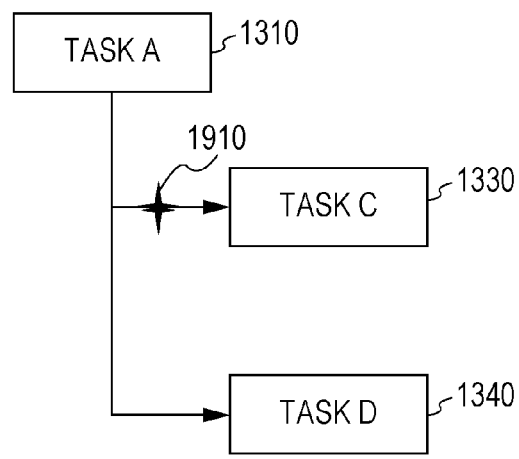
FIG. 19 illustrates an example of the presentation of a sign of a deleted task.

Further, the presentation module 1560 presents structure information stored in the task-relevant information/person storage module 570. If the access right checking module 1540 checks that the user ID of a user who has issued an instruction for presenting the structure information has been stored in the task-relevant information/person storage module 570, the presentation module 1560 may present a sign indicating the previous existence of a deleted task on the basis of the task-relevant information stored in the task-relevant information/person storage module 570 in association with the user ID. For example, in accordance with an instruction given by a user for presenting a graphical representation of structure information, a structure illustrated in the example of FIG. 19 may be presented. The sign may be a mark such as a deletion mark 1910 indicating a trace of the deletion operation as illustrated in the example of FIG. 19, or any other mark.

The sign may be presented at the previous position of the task (the position at which the task is located before the deletion of the task), and is calculated on the basis of task-relevant information stored in the task-relevant information/person storage module 570. More specifically, if tasks having a parent-child relationship with the deleted task are found, a sign is presented between the parent task and the child task. Further, if a task having a parent relationship with the deleted task is found (if a task having a child relationship is not found), a sign is presented as a task that is a child of the parent task. Further, if a task having a child relationship with the deleted task is found (if a task having a parent relationship is not found), a sign is presented as a task that is a parent of the child task. Alternatively, if a sign is selected in accordance with an operation performed by a user, information relevant to a task corresponding to the sign (for example, the presentation screen 1800 illustrated by way of in FIG. 18) may be presented.

The task-relevant information/person storage module 570 is connected to the deleted task processing module 1520, and is accessed from the modules in the deleted task processing module 1520. It is to be understood that the task-relevant information/person storage module 570 is the same as the task-relevant information/person storage module 570 illustrated in the example of FIG. 5.

Figure 16:
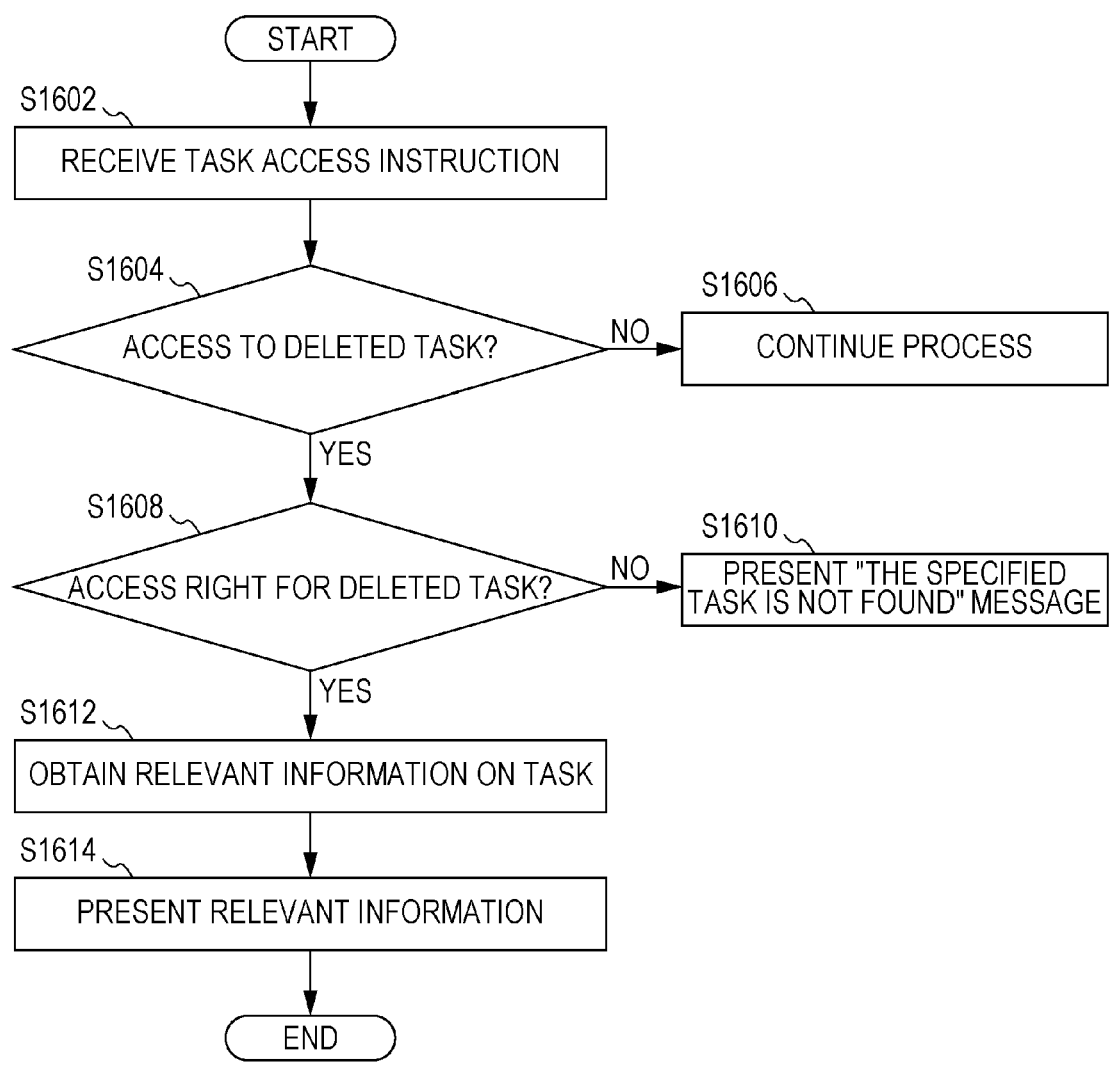
FIG. 16 is a flowchart illustrating an example process performed by the deleted task monitoring module.

FIG. 16 is a flowchart illustrating an example process performed by the deleted task monitoring module 160.

In step S1602, the task access instruction receiving module 1510 receives an instruction for accessing a task in accordance with an operation performed by a user.

In step S1604, the deleted task access determination module 1530 determines whether or not the access is access to a deleted task. If the access is access to a deleted task, the process proceeds to step S1608, or otherwise, the process proceeds to step S1606.

In step S1606, the task management module 110 continues the process. That is, since the access is not access to a deleted task, another process is performed.

In step S1608, the access right checking module 1540 determines whether or not the user has an access right for the deleted task. If the user has an access right, the process proceeds to step S1612, or otherwise, the process proceeds to step S1610.

In step S1610, the presentation module 1560 presents a message "the specified task is not found". Since the user has no access right for the deleted task, information relevant to the deleted task is not presented.

In step S1612, the deleted-task-relevant information obtaining module 1550 obtains task-relevant information (information relevant to a task having a structure of parent-child relationship with the deleted task, link information included in the deleted task).

In step S1614, the presentation module 1560 presents the relevant information.

Figure 20:
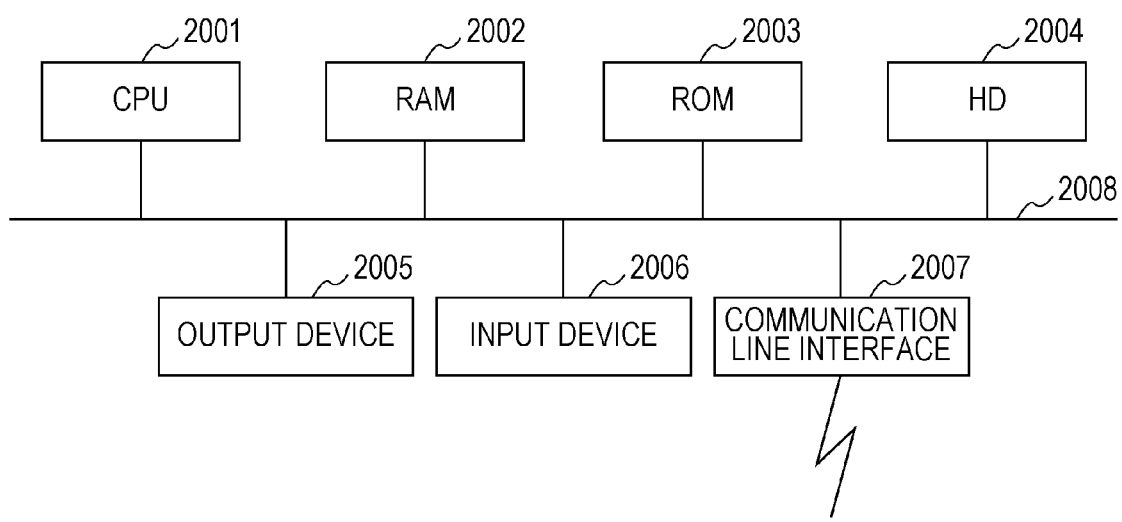
FIG. 20 is a block diagram illustrating an example hardware configuration of a computer according to this exemplary embodiment.

As illustrated by way of example in FIG. 20, which illustrates a hardware configuration, a computer that executes a program according to this exemplary embodiment may be a general computer, and may be specifically a personal computer, a computer capable of being a server, or the like. That is, as a specific example, a CPU 2001 may be used as a processing unit (arithmetic unit), and a RAM 2002, a read-only memory (ROM) 2003, and a hard disk (HD) 2004 may be used as storage devices. For example, a hard disk may be used as the HD 2004. The computer includes the CPU 2001 that executes a program implementing the task management module 110, the user management module 120, the document management module 130, the deletion instruction receiving module 510, the task-relevant information obtaining module 530, the task-relevant information/person obtaining module 540, the task deletion module 550, the structure change module 560, the task access instruction receiving module 1510, the deleted task access determination module 1530, the access right checking module 1540, the deleted-task-relevant information obtaining module 1550, and the like; the RAM 2002 that stores the program and data; the ROM 2003 that stores a program for booting the computer, and any other suitable item; the HD 2004 that serves as an auxiliary storage device; an input device 2006 configured to input data, such as a keyboard and a mouse; an output device 2005 such as a cathode-ray tube (CRT) or a liquid crystal display; a communication line interface 2007 for connecting to a communication network, such as a network interface card; and a bus 2008 through which the above components are connected to one another to exchange data. Multiple computers each having the above configuration may also be connected to one another via a network.

In the foregoing exemplary embodiment, elements based on a computer program may be implemented by causing a system having the above hardware configuration to read the computer program and allowing software and hardware resources to cooperate with each other.

The hardware configuration illustrated in FIG. 20 is merely an example configuration, and this exemplary embodiment is not limited to the configuration illustrated in FIG. 20 so long as to be capable of executing the modules described in the exemplary embodiment. For example, some modules may be configured using dedicated hardware (such as an application specific IC (ASIC)), and other modules may be provided in an external system and may be connected via a communication line. Alternatively, multiple systems each having the configuration illustrated in FIG. 20 may be connected to one another via a communication line and may operate in association with one another. Furthermore, the system illustrated in FIG. 20 may be incorporated in, in particular, a personal computer, a home information appliance, a copier, a facsimile machine, a scanner, a printer, a multifunctional device (an image processing apparatus having at least two of functions such as scanner, printer, copier, and facsimile functions), or the like.

In the foregoing exemplary embodiment, the deleted task processing system 140 operating in association with the bulletin board system 100 is provided by way of example, and supports content called "task". The technique disclosed herein may also be used in systems supporting other items of content having similar structures, such as "message", "folder", "Wiki page", and "HTML page".

In the foregoing exemplary embodiment, the term "presentation" may include display on a display device such as a display, and printing using a printing device such as a printer, and output of audio from an audio output device such as a speaker, and may also be a combination thereof.

In the foregoing exemplary embodiment, the deleted task processing system 140 includes both the deleted task management module 150 and the deleted task monitoring module 160, by way of example. However, the deleted task processing system 140 may include one of the deleted task management module 150 and the deleted task monitoring module 160. An information processing program and an information processing apparatus that provide only the deletion function, an information processing program and an information processing apparatus that provide only the function of presenting a deleted task may also be used.

The processes of each module may use any technique of the related art.

A program described herein may be provided in the form of being stored in a recording medium, or may be provided via a communication medium. In this case, for example, a computer readable medium storing the program described above may constitute an exemplary embodiment of the present invention.

The computer readable recording medium may be a computer readable recording medium storing a program, which is used for installation, execution, distribution, of the like of the program.

Examples of the recording medium include a digital versatile disc (DVD), a disc complying with a DVD Forum standard, such as a DVD-Recordable (DVD-R), DVD-Rewritable (DVD-RW), or DVD-RAM disc, a disc complying with a format supported by the DVD+RW Alliance, such as a DVD+R or DVD+RW disc, a compact disc read-only memory (CD-ROM) disc, a CD-Recordable (CD-R) disc, a CD-Rewritable (CD-RW) disc, a Blu-ray Disc (registered trademark), a magneto-optical (MO) disk, a flexible disk (FD), a magnetic tape, a hard disk, a ROM, an electrically erasable programmable read-only memory (EEPROM), a flash memory, and a RAM.

The above program or a portion thereof may be recorded in any of the above recording media for saving, distribution, or the like, or may be transmitted via communication using a transmission medium such as a wired network used for a local area network (LAN), a metropolitan area network (MAN), a wide area network (WAN), the Internet, an intranet, and an extranet, or the like, a wireless communication network, or a combination thereof, or carried on a carrier.

Furthermore, the program described above may be a part of another program, or may be recorded in a recording medium together with a different program. The program may also be recorded separately on plural recording media. The program may also be recorded in any form being capable of recovered such as compressed or encoded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing an information processing program causing a computer to execute a process comprising:
   receiving an instruction for deleting an information group including pieces of information from a first memory, the first memory storing a plurality of information groups and structure information indicating a structure of parent-child relationship between a first information group and a second information group, the first information group and the second information group being included in the plurality of information groups;
   extracting information regarding parent-child-relationship information groups from the first memory, the parent-child-relationship information groups being information groups having a structure of parent-child relationship with a deletion target information group, the deletion target information group being an information group to be deleted in accordance with the received instruction;
   extracting a user identification code associated with the deletion target information group from a second memory, the second memory storing, in association with each other, an information group identification code uniquely identifying an information group, and a user identification code uniquely identifying a user who has a right to perform an operation on the information group;
   storing an information group identification code of the deletion target information group, the information regarding the parent-child-relationship information groups, and the extracted user identification code in association with one another in a third memory;
   deleting the deletion target information group from the first memory; and
   changing the structure information stored in the first memory to structure information obtained after the deletion target information group has been deleted from the first memory, by changing one of the parent-child-relationship information groups that is a child of the deletion target information group as a child information group of another of the parent-child-relationship information groups that is a parent of the deletion target information group.

2. The non-transitory computer readable medium according to claim 1, wherein an information group stored in the first memory includes position information for linking to other information,
   wherein in the extracting of information regarding parent-child-relationship information groups, position information included in the deletion target information group stored in the first memory is extracted, and
   wherein in the storing of an information group identification code, the information group identification code of the deletion target information group, the information regarding the parent-child-relationship information groups, the position information, and the extracted user identification code are stored in association with one another in the third memory.

3. A non-transitory computer readable medium storing an information processing program causing a computer to execute a process comprising:
   receiving an instruction for reading an information group including pieces of information in accordance with an operation performed by the user;
   determining whether or not a third memory stores an information group identification code of a read-target information group, the read-target information group being an information group to be read in accordance with the received instruction, the third memory storing, in association with one another, an information group identification code of a deleted information group, information regarding information groups having a structure of parent-child relationship with the deleted information group, and a user identification code uniquely identifying a user who has a right to perform an operation on the deleted information group;
   checking that, if it is determined that the third memory stores the information group identification code of the read-target information group, the third memory stores, in association with the read-target information group, a user identification code of the user who has performed the operation that the received instruction is based on;
   extracting from the third memory, if it is confirmed that the third memory stores the user identification code in association with the read-target information group, information regarding an information group having a structure of parent-child relationship with the read-target information group; and
   presenting the extracted information.

4. The non-transitory computer readable medium according to claim 3, wherein the third memory stores, in association with one another, an information group identification code of a deleted information group, information regarding information groups having a structure of parent-child relationship with the deleted information group, position information for linking to other information, the position information being included in the deleted information group, and a user identification code uniquely identifying a user who has a right to perform an operation on the deleted information group,
   wherein in the extracting, if it is confirmed that the third memory stores the user identification code in association with the read-target information group, position information that is stored in association with the information group identification code of the read-target information group and that is included in the read-target information group is extracted from the third memory, and
   wherein in the presenting, the extracted position information is presented.

5. The non-transitory computer readable medium according to claim 4, wherein a first memory stores a plurality of information groups and structure information indicating a structure of parent-child relationship between a first information group and a second information group, the first information group and the second information group being included in the plurality of information groups, and, in the presenting, the structure information is presented, and wherein in the presenting, if it is confirmed that the third memory stores a user identification code of a user who has issued an instruction for presenting the structure information, a sign indicating previous existence of a deleted information group is presented in accordance with information regarding an information group stored in association with the user identification code in the third memory.

6. The non-transitory computer readable medium according to claim 3, wherein a first memory stores a plurality of information groups and structure information indicating a structure of parent-child relationship between a first information group and a second information group, the first information group and the second information group being included in the plurality of information groups, and, in the presenting, the structure information is presented, and wherein in the presenting, if it is confirmed that the third memory stores a user identification code of a user who has issued an instruction for presenting the structure information, a sign indicating previous existence of a deleted information group is presented in accordance with information regarding an information group stored in association with the user identification code in the third memory.

7. A non-transitory computer readable medium storing an information processing program causing a computer to execute a process comprising:

receiving an instruction for deleting an information group from a first memory, the first memory storing a plurality of information groups each being a group of pieces of information, and structure information indicating a structure of parent-child relationship between a first information group and a second information group, the first information group and the second information group being included in the plurality of information groups;

extracting information regarding parent-child-relationship information groups from the first memory, the parent-child-relationship information groups being information groups having a structure of parent-child relationship with a deletion target information group, the deletion target information group being an information group to be deleted in accordance with the received instruction;

extracting a user identification code associated with the deletion target information group from a second memory, the second memory storing, in association with each other, an information group identification code uniquely identifying an information group, and a user identification code uniquely identifying a user who has a right to perform an operation on the information group;

storing an information group identification code of the deletion target information group, the information regarding the parent-child-relationship information groups, and the extracted user identification code in association with one another in a third memory;

deleting the deletion target information group from the first memory;

changing the structure information stored in the first memory to structure information obtained after the deletion target information group has been deleted from the first memory, by changing one of the parent-child-relationship information groups that is a child of the deletion target information group as a child information group of another of the parent-child-relationship information groups that is a parent of the deletion target information group;

receiving an instruction for reading an information group including pieces of information in accordance with an operation performed by the user;

determining whether or not the third memory stores an information group identification code of a read-target information group, the read-target information group being an information group to be read in accordance with the received instruction;

checking that, if it is determined that the third memory stores the information group identification code of the read-target information group, the third memory stores, in association with the read-target information group, a user identification code of the user who has performed the operation that the received instruction is based on;

extracting from the third memory, if it is confirmed that the third memory stores the user identification code in association with the read-target information group, information regarding an information group having a structure of parent-child relationship with the read-target information group; and presenting the extracted information.

8. An information processing apparatus comprising:

a deletion instruction receiving unit that receives an instruction for deleting an information group including pieces of information, the deletion instruction receiving unit receiving the information group from a first memory, the first memory storing a plurality of information groups and structure information indicating a structure of parent-child relationship between a first information group and a second information group, the first information group and the second information group being included in the plurality of information groups;

a relevant information extraction unit that extracts information regarding parent-child-relationship information groups from the first memory, the parent-child-relationship information groups being information groups having a structure of parent-child relationship with a deletion target information group, the deletion target information group being an information group to be deleted in accordance with the instruction received by the deletion instruction receiving unit;

a user extraction unit that extracts a user identification code associated with the deletion target information group from a second memory, the second memory storing, in association with each other, an information group identification code uniquely identifying an information group, and a user identification code uniquely identifying a user who has a right to perform an operation on the information group;

a memory that stores an information group identification code of the deletion target information group, the information regarding the parent-child-relationship information groups, and the user identification code extracted by user extraction unit in association with one another in a third memory;

a deletion unit that deletes the deletion target information group from the first memory; and a change unit that changes the structure information stored in the first memory to structure information obtained after the deletion unit has deleted the deletion target information group from the first memory, by changing one of the parent-child-relationship information groups that is a child of the deletion target information group as a child information group of another of the parent-childrelationship information groups that is a parent of the deletion target information group.

9. An information processing apparatus comprising:
a reading instruction receiving unit that receives an instruction for reading an information group including pieces of information in accordance with an operation performed by the user;
a determination unit that determines whether or not a third memory stores an information group identification code of a read-target information group, the read-target information group being an information group to be read in accordance with the instruction received by the reading instruction receiving unit, the third memory storing, in association with one another, an information group identification code of a deleted information group, information regarding information groups having a structure of parent-child relationship with the deleted information group, and a user identification code uniquely identifying a user who has a right to perform an operation on the deleted information group;
a checking unit that checks that, if the determination unit determines that the third memory stores the information group identification code of the read-target information group, the third memory stores, in association with the read-target information group, a user identification code of the user who has performed the operation that the instruction received by the reading instruction receiving unit is based on;
an extraction unit that extracts from the third memory, if the checking unit confirms that the third memory stores the user identification code in association with the read-target information group, information regarding an information group having a structure of parent-child relationship with the read-target information group; and
a presentation unit that presents the information extracted by the extraction unit.

10. An information processing apparatus comprising:
a deletion instruction receiving unit that receives an instruction for deleting an information group from a first memory, the first memory storing a plurality of information groups each being a group of pieces of information, and structure information indicating a structure of parent-child relationship between a first information group and a second information group, the first information group and the second information group being included in the plurality of information groups;
a relevant information extraction unit that extracts information regarding parent-child-relationship information groups from the first memory, the parent-child-relationship information groups being information groups having a structure of parent-child relationship with a deletion target information group, the deletion target information group being an information group to be deleted in accordance with the instruction received by the deletion instruction receiving unit;
a user extraction unit that extracts a user identification code associated with the deletion target information group from a second memory, the second memory storing, in association with each other, an information group identification code uniquely identifying an information group, and a user identification code uniquely identifying a user who has a right to perform an operation on the information group;
a memory that stores an information group identification code of the deletion target information group, the information regarding the parent-child-relationship information groups, and the user identification code extracted by the user extraction unit in association with one another in a third memory;
a deletion unit that deletes the deletion target information group from the first memory;
a change unit that changes the structure information stored in the first memory to structure information obtained after the deletion unit has deleted the deletion target information group from the first memory, by changing one of the parent-child-relationship information groups that is a child of the deletion target information group as a child information group of another of the parent-child-relationship information groups that is a parent of the deletion target information group;
a reading instruction receiving unit that receives an instruction for reading an information group including pieces of information in accordance with an operation performed by the user;
a determination unit that determines whether or not the third memory stores an information group identification code of a read-target information group, the read-target information group being an information group to be read in accordance with the instruction received by the reading instruction receiving unit;
a checking unit that checks that, if the determination unit determines that the third memory stores the information group identification code of the read-target information group, the third memory stores, in association with the read-target information group, a user identification code of the user who has performed the operation that the instruction received by the reading instruction receiving unit is based on;
an extraction unit that extracts from the third memory, if the checking unit confirms that the third memory stores the user identification code in association with the read-target information group, information regarding an information group having a structure of parent-child relationship with the read-target information group; and
a presentation unit that presents the information extracted by the extraction unit.

11. An information processing method comprising:
receiving an instruction for reading an information group including pieces of information in accordance with an operation performed by the user;
determining whether or not a third memory stores an information group identification code of a read-target information group, the read-target information group being an information group to be read in accordance with the received instruction, the third memory storing, in association with one another, an information group identification code of a deleted information group, information regarding information groups having a structure of parent-child relationship with the deleted information group, and a user identification code uniquely identifying a user who has a right to perform an operation on the deleted information group;
checking that, if it is determined that the third memory stores the information group identification code of the read-target information group, the third memory stores, in association with the read-target information group, a user identification code of the user who has performed the operation that the received instruction is based on;
extracting from the third memory, if it is confirmed that the third memory stores the user identification code in association with the read-target information group, information regarding an information group having a structure of parent-child relationship with the read-target information group; and presenting the extracted information.

* * * * *